United States Patent [19]

Ishino et al.

[11] 4,335,291

[45] Jun. 15, 1982

[54] POPPED CORN MAKING APPARATUS USED IN A MICROWAVE OVEN

[75] Inventors: Ken Ishino; Taro Miura; Yasuo Hashimoto, all of Tokyo, Japan

[73] Assignee: TDK Electronics Co., Ltd., Tokyo, Japan

[21] Appl. No.: 137,257

[22] Filed: Apr. 4, 1980

[30] Foreign Application Priority Data

Jul. 23, 1979 [JP] Japan ................................. 54-92596

[51] Int. Cl.$^3$ ............................................. H05B 6/80
[52] U.S. Cl. ............................ 219/10.55 E; 99/323.5; 99/323.8; 219/10.55 F; 426/243
[58] Field of Search ................ 219/10.55 E, 10.55 R, 219/10.55 M, 10.55 F, 432; 99/323.4, 323.5, 323.8, 345, 347; 426/107, 113, 241, 243, 449

[56] References Cited

U.S. PATENT DOCUMENTS

| | | | |
|---|---|---|---|
| D. 255,536 | 6/1980 | Bowen et al. | 219/10.55 E |
| D. 255,537 | 6/1980 | Bowen et al. | 219/10.55 E |
| 4,156,806 | 5/1979 | Teich et al. | 219/10.55 E |
| 4,158,760 | 6/1979 | Bowen et al. | 219/10.55 E |
| 4,166,208 | 8/1979 | Martel et al. | 219/10.55 E |

OTHER PUBLICATIONS

Technique of Microwave Measurements, Montgomery, C. G., McGraw Hill, 1947.
Courtney, W. E. *Analysis and Evaluation of a Method of Measuring the Complex Permittivity and Permeability of Microwave Insulators*, IEEE Trans. Micr. vol. MTT 18, No. 8, Aug. 1970, pp. 476–477.

*Primary Examiner*—Arthur T. Grimley
*Attorney, Agent, or Firm*—Oblon, Fisher, Spivak, McClelland & Maier

[57] ABSTRACT

A popped corn making apparatus used in a microwave oven comprises a bowl having an opening at the upper part and a narrow closed bottom and a substantially conical shape; and a resonator placed at the bottom of said bowl. The electric field resulted by resonance of said resonator under an application of microwave, is applied to grains of corn contained in said bowl to produce a popped corn.

It is possible to use a lumped element resonator comprising a one turn coil having a ring shape having an opening which is placed at the bottom of said bowl and which is formed by an inductance provided by said coil and a capacitance provided by said bowl and said grains of corn.

6 Claims, 14 Drawing Figures

FIG. 7 (a)
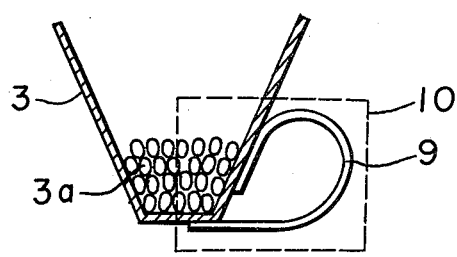
FIG. 7 b
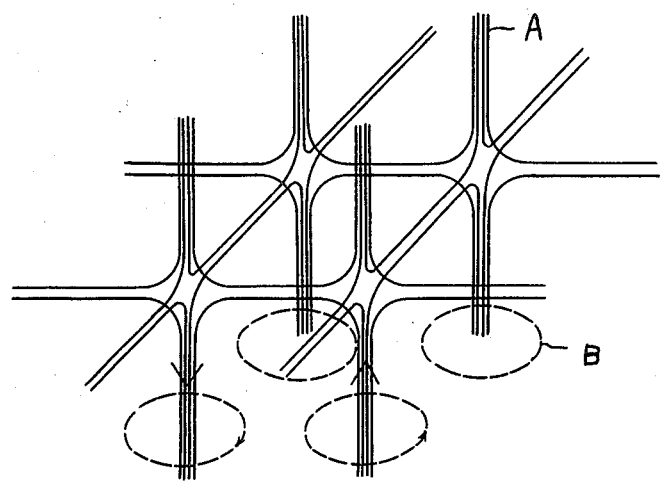
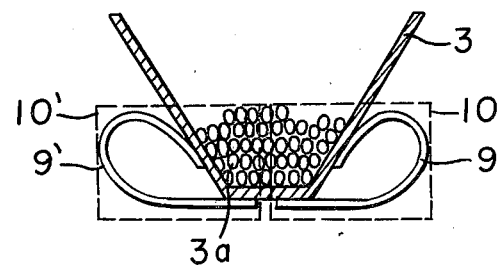
FIG. 8

POPPED CORN MAKING APPARATUS USED IN A MICROWAVE OVEN

BACKGROUND OF THE INVENTION

1. Field of the Invention

The present invention relates to a popped corn making apparatus. In particularly, it relates to a popped corn making apparatus which is suitable for making popped corn in a microwave oven.

2. DESCRIPTION OF THE PRIOR ART

A microwave oven is a cooking apparatus for applying microwave power to food as a heated substance. The food is heated for a short time. Therefore, the microwave oven has been widely used for cooking various foods in both business and household uses.

A popped corn making apparatus used in a microwave oven has been proposed as one of the auxiliary equipments for the microwave oven. FIG. 1 shows a conventional popped corn making apparatus which comprises a bowl (1) having a conical shape with an opening at the upper part and a closed bottom and a plastic or ceramic microwave concentrator (2) which holds the bowl (1) at the bottom. When the microwave energy is applied in the microwave oven, the electric flux density at the lower part of the bowl (1) containing grains of corn (1a) increases by dielectric constant of the concentrator (2). A popped corn can be obtained by utilizing this phenomenon. Thus, in the conventional apparatus, the microwave field applied to the grains of corn is increased only by the dielectric constant of the concentrator whereby in order to obtain enough microwave energy for all of the grains to pop a long period of time is required. This long period of time can cause burning and the productivity and efficiency are not satisfactory.

SUMMARY OF THE INVENTION

It is an object of the present invention to overcome the disadvantages of the conventional apparatus and to provide a popped corn making apparatus having high productivity and efficiency which is used in a microwave oven.

The foregoing and other objects of the present invention have been attained by providing a popped corn making apparatus used in a microwave oven which comprises a resonator instead of a concentrator to heat grains of corn by strong microwave field resulted from the resonation of the resonator.

BRIEF DESCRIPTION OF THE DRAWINGS

FIG. 7(a) is a schematic view of a sixth embodiment of a popped corn making apparatus of the present invention;

FIG. 7(b) shows distribution of electromagnetic field in a chamber of the microwave oven;

FIG. 8 is a seventh embodiment of a popped corn making apparatus of the present invention.

DETAILED DESCRIPTION OF THE PREFERRED EMBODIMENTS

Figure 1:
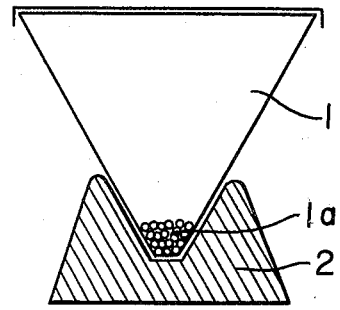
FIG. 1 is a schematic view of a conventional popped corn making apparatus.
Figure 2:
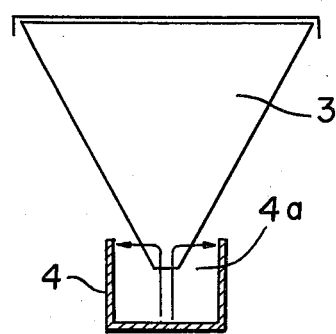
FIG. 2(a) is a schematic view of a first embodiment of a popped corn making apparatus of the present invention.
FIG. 2(b) shows electric flux direction in a cavity resonator of the first embodiment.
Figure 2:
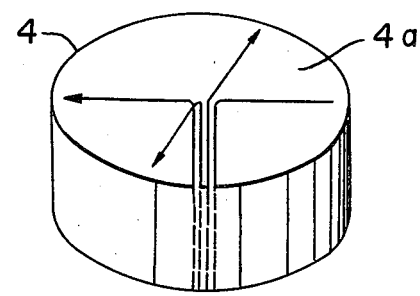

FIG. 2(a) shows the first embodiment of the popped corn making apparatus of the present invention and FIG. 2(b) shows electric flux direction in a cavity resonator. In the drawing, the reference numeral (3) designates a conical bowl which has an opening at the upper part and a narrow closed bottom; (4) designates a cylindrical cavity resonator having an opening (4a) at one surface. The bowl (3) is set so as to receive the bottom of the bowl (3) by the opening (4a) of the cavity resonator (4). The cavity resonator (4) used in the embodiment is operated in $TM_{01\ 1/2}$ mode and is formed to have the maximum field in the resonance near the opening (4). The electric flux in the cavity resonator (4) has the direction shown in FIG. 2(b).

In accordance with the structure of the popped corn making apparatus of the present invention, the electric field in the cavity resonator (4) is the maximum in the resonance whereby enough microwave field can be applied to the grains of corn put in the bowl (3). Therefore, the grains of corn at the bottom are concentrically heated which result in popping. The grains are pushed upward by the resulting kinetic energy thereby stirring the contents of the bowl (3) whereby non-popped grains are moved to the bottom and the popped corn can be effectively produced. The resonator is operated under the frequency of the microwave oven.

Figure 3:
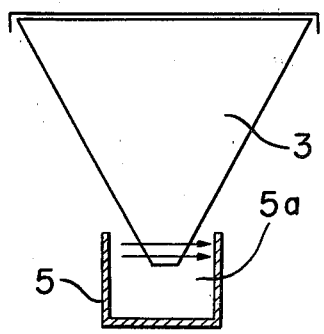
FIG. 3(a) is a schematic view of a second embodiment of a popped corn making apparatus of the present invention.
FIG. 3(b) shows electric flux direction in a cavity resonator of the second embodiment.
Figure 3:
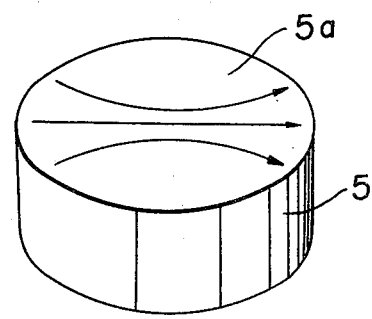

FIG. 3(a) shows the second embodiment of the popped corn making apparatus of the present invention.

The bowl (3) and the cylindrical cavity resonator (5) having the opening part (5a) at one surface have the structure same as those of the first embodiment and the bottom of the bowl (3) is received on the opening (5a) of the resonator (5). The feature of the second embodiment is to have the structure for operating the cavity resonator (5) in $TE_{11\ 1/2}$ mode and is formed to have the maximum field in the resonance near the opening (5a). FIG. 3(b) shows the electric flux direction in the resonator. As the first embodiment, enough microwave field is applied to the grains of corn.

Figure 4:
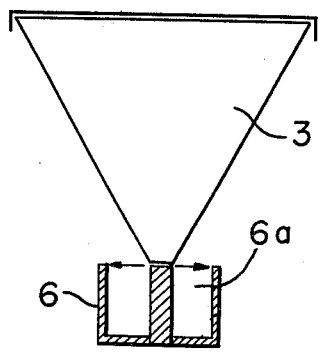
FIG. 4(a) is a schematic view of a third embodiment of a popped corn making apparatus of the present invention.
FIG. 4(b) shows electric flux direction in a coaxial line type resonator of the third embodiment.
Figure 4:
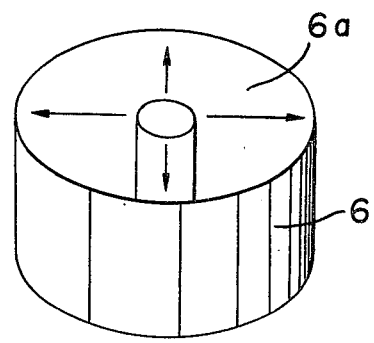

FIG. 4(a) shows the third embodiment of the popped corn making apparatus of the present invention. The feature of the third embodiment is to have the bowl (3) (the same as the first embodiment) and a coaxial resonator (6) having an opening at one end and the bottom of the corn bowl (3) is received on the opening (6a) of the resonator (6). In the coaxial line type resonator (6) of this embodiment, the resonator length operated in TEM mode is λ/4. FIG. 4(b) shows the electric flux direction in the coaxial line type resonator (6). In accordance with the embodiment, the loss is greater because of the addition of the central conductive substrate. Thus, the microwave field applied to the grains of corn can be strong enough as those of the first and second embodiments.

Figure 5:
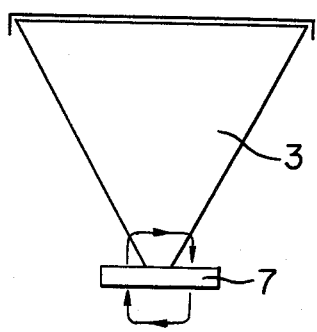
FIG. 5(a) is a schematic view of a fourth embodiment of a popped corn making apparatus of the present invention.
FIG. 5(b) shows leaked electric flux direction of a dielectric resonator of the fourth embodiment.
Figure 5:
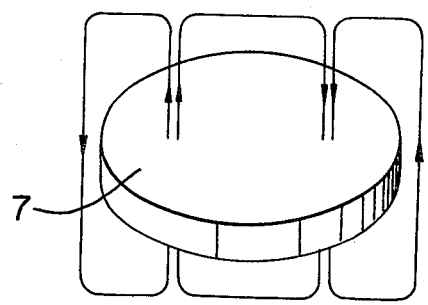

FIG. 5(a) shows the fourth embodiment of the popped corn making apparatus. The feature of this embodiment is to have the bowl (3) (the same as the first embodiment) and a cylindrical dielectric resonator (7). The bottom of the bowl (3) is placed near the center of the resonator (7). The resonator (7) has $TM_{110}$ resonance mode and the leaked electric flux direction is shown in FIG. 5(b). At the resonance, the strong leaked electric flux is passed through the lower part of the bowl (3) whereby enough microwave field is applied to the grains of corn in the bowl (3).

Figure 6:
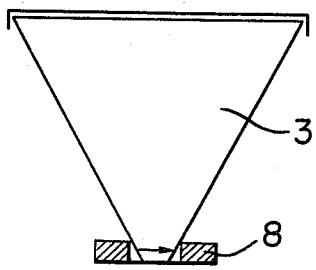
FIG. 6(a) is a schematic view of a fifth embodiment of a popped corn making apparatus of the present invention.
FIG. 6(b) shows leaked electric flux direction of a dielectric resonator of the fifth embodiment.
Figure 6:
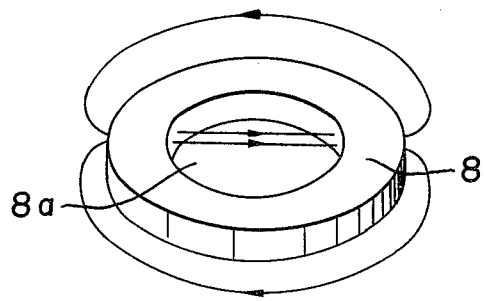

FIG. 6(a) shows the fifth embodiment of the popped corn making apparatus of the present invention. The feature of this embodiment is to have a dielectric resonator having the $TE_{11\delta}$ resonance mode. The bowl (3) is the same as that of the first embodiment and the dielectric resonator (8) has a form of a ring having a hollow (8a) at the center of the cylindrical resonator and the bottom of the bowl (3) is received by the hollow (8a) of the resonator (8). As shown in FIG. 6(b), the strong microwave field is applied at the center of the dielectric substance in the $TE_{11\delta}$ mode, because of the ring shape of the resonator (8). As a result, the microwave electric flux in the hollow (8a) passes through grains of corn in the bowl (3) whereby enough microwave field is applied to the grains of corn.

FIG. 7(a) shows the sixth embodiment of the popped corn making apparatus of the present invention. The feature of this embodiment is to have a lumped element resonator having an inductance provided by a one turn coil and a capacitance provided by the bowl and the grains of corn. The bowl (3) is the same as that of the first embodiment and the one turn coil (9) is placed at the bottom of the bowl (3). The one turn coil (9) has the structure of a ring having one opening, for example, having 2 mm of a thickness, 7 mm of a width and 10 mm of a diameter. Both edges of the coil (9) form round shapes so as to prevent corona discharge. The resonance frequency of the resonator (10) should be tuned to the operating frequency of the microwave oven.

FIG. 7(b) shows the distribution of electromagnetic field in the chamber of the microwave oven wherein the reference (a) designates the line of electric flux and (b) designates the magnetic flux.

When the popped corn making apparatus is placed in the chamber of the microwave oven, the resonator (10) can apply enough microwave field to the grains of corn if the resonator is placed at the position of strong electric field. On the other hand, when the resonator is placed at the position of intense magnetic field, a large current is induced in the coil by the magnetic flux crossing the coil, and then this current is converted to strong electric field in the resonator to heat the grains of corn. In this case the resonance frequency should be approximately the same to the operating frequency of the microwave oven, say 2.4 GHz.

In accordance with this embodiment, both of the electric field and the magnetic field are utilized for the production of the popped corn whereby high productivity and efficiency can be attained regardless of the structure of the microwave oven. The inductance for the resonator is not limited to the coil but can be transmission lines having a center conductor which is not surrounded by a ground plate such as parallel lines, triplate, microstrip, slot and coplaner, i.e. open type transmission line.

The apparatus having the structure of this embodiment of the present invention and the conventional apparatus are compared for tests by using 35 g. of grains of corn. For the same cooking time, 30 to 40 non-popped grains remain in the conventional apparatus whereas only 1 to 2 non-popped grains remain in the apparatus of the embodiment.

FIG. 8 shows the seventh embodiment of the popped corn making apparatus of the present invention which is an improvement of the sixth embodiment. The feature of this embodiment is to have a plurality of the resonators which have desired frequency differences. The same references designate the same parts as those of FIG. 7(a).

In the resonance system of the sixth embodiment, one resonator is turned to the frequency of the microwave oven when non-popped grains of corn (3a) are contained in the bowl. Then the grains of corn (3a) are popped to decrease the effective dielectric constant and to decrease the capacitance of the resonator (10), the resonance frequency is shifted higher and the resonator can not feed energy to the grains of corn (3a). Therefore, the other resonantor (10') having the inductance provided by the coil (9') and the capacitance provided by the partially popped grains (3a) and the bowl (3) is equipped, with a resonance frequency tuned to the operating frequency of the oven, whereby the second resonator (10') is operated successively even though the resonance frequency of the first resonator (10) is out of the resonance. The productivity and efficiency are improved.

As described above, in accordance with the popped corn making apparatus of the present invention, the popped corn is produced by utilizing the phenomenon of the electromagnetic field of the resonator being increased during the resonance. The sufficient electric field can be applied to the grains of corn, to provide the popped corn making apparatus having high productivity and efficiency which is used in a microwave oven.

We claim:

1. A popped corn making apparatus used in a microwave oven which comprises a bowl having an opening at the upper part and a narrow closed bottom and a substantially conical shape; and a resonator placed at the bottom of said bowl whereby electric field resulted by resonance of said resonator under an application of microwave, is applied to grains of corn contained in said bowl to produce a popped corn.

2. A popped corn making apparatus according to claim 1 wherein said resonator is a cavity resonator.

3. A popped corn making apparatus according to claim 1 wherein said resonator is a coaxial line type resonator.

4. A popped corn making apparatus according to claim 1 wherein said resonator is a dielectric resonator.

5. A popped corn making apparatus used in a microwave oven which comprises a bowl having an opening at the upper part and a narrow closed bottom and a substantially conical shape; and a lumped element resonator having a predetermined resonance frequency, which comprises a one turn coil having a ring shape having an opening which is placed at the bottom of said bowl and which is formed by an inductance provided by said coil and a capacitance provided by said bowl and said grains of corn, whereby the electric field resulted by the resonance of said resonator under an application of microwave is applied to grains of corn contained in said bowl to produce a popped corn.

6. A popped corn making apparatus according to claim 5 wherein a plurality of resonators having different resonance frequency are used as said resonator.

* * * * *